US008041066B2

(12) United States Patent
Solum

(10) Patent No.: US 8,041,066 B2
(45) Date of Patent: Oct. 18, 2011

(54) WIRELESS SYSTEM FOR HEARING COMMUNICATION DEVICES PROVIDING WIRELESS STEREO RECEPTION MODES

(75) Inventor: Jeffrey Paul Solum, Deephaven, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 1228 days.

(21) Appl. No.: 11/619,541

(22) Filed: Jan. 3, 2007

(65) Prior Publication Data

US 2008/0159548 A1 Jul. 3, 2008

(51) Int. Cl.

*H04M 1/00* (2006.01)
*H04M 9/00* (2006.01)
*H04R 25/00* (2006.01)
*H04B 7/00* (2006.01)

(52) U.S. Cl. ........ 381/370; 381/312; 379/430; 455/41.2

(58) Field of Classification Search .......... 381/370–384, 381/312, 315; 379/430; 455/41.2, 41.3, 455/585.2, 575.2

See application file for complete search history.

(56) References Cited

U.S. PATENT DOCUMENTS 2,530,621 A 11/1950 Lybarger
2,554,834 A 5/1951 Lavery
2,656,421 A 10/1953 Lybarger
3,396,245 A 8/1968 Flygstad
3,527,901 A 9/1970 Geib
3,571,514 A 3/1971 Wruk
3,660,695 A 5/1972 Schmitt
3,770,911 A 11/1973 Knowles et al.
3,798,390 A 3/1974 Gage et al.
3,836,732 A 9/1974 Johanson et al.
3,875,349 A 4/1975 Ruegg
3,894,196 A 7/1975 Briskey
3,946,168 A 3/1976 Preves
3,975,599 A 8/1976 Johanson
4,051,330 A 9/1977 Cole
4,142,072 A 2/1979 Berland
4,187,413 A 2/1980 Moser
4,366,349 A 12/1982 Adelman
4,395,601 A 7/1983 Kopke et al.
4,396,806 A 8/1983 Anderson
4,419,544 A 12/1983 Adelman
4,425,481 A 1/1984 Mansgold et al.
4,449,018 A 5/1984 Stanton (Continued)

FOREIGN PATENT DOCUMENTS

CH 670349 5/1989

(Continued)

OTHER PUBLICATIONS

Haartsen, J., "Bluetooth—The Universal Radio Interface for Ad Hoc, Wireless Connectivity", *Ericsson Review, No. 3,* (1998), 110-117.

(Continued)

*Primary Examiner* — Tuan Nguyen

(74) *Attorney, Agent, or Firm* — Schwegman, Lundberg & Woessner, P.A.

(57) ABSTRACT

The present subject matter relates to the wireless stereo reception of first and second audio information by wireless hearing communication devices. One type of device which may employ the present subject matter is a hearing assistance device, such as a hearing aid. Various forms and protocols of signal transmission are employed in varying embodiments. The present subject matter includes various communication modes such as eavesdropping modes and relaying modes.

28 Claims, 3 Drawing Sheets

U.S. PATENT DOCUMENTS 4,456,795 A 6/1984 Saito
4,467,145 A 8/1984 Borstel
4,471,490 A 9/1984 Bellafiore
4,489,330 A 12/1984 Marutake et al.
4,490,585 A 12/1984 Tanaka
4,508,940 A 4/1985 Steeger
4,596,899 A 6/1986 Wojcik et al.
4,622,440 A 11/1986 Slavin
4,631,419 A 12/1986 Sadamatsu et al.
4,637,402 A 1/1987 Adelman
4,638,125 A 1/1987 Buettner
4,696,032 A 9/1987 Levy
4,710,961 A 12/1987 Buttner
4,712,244 A 12/1987 Zwicker et al.
4,723,293 A 2/1988 Harless
4,751,738 A 6/1988 Widrow et al.
4,756,312 A 7/1988 Epley
4,764,957 A 8/1988 Angelini et al.
4,845,755 A 7/1989 Busch et al.
4,862,509 A 8/1989 Towsend
4,882,762 A 11/1989 Waldhauer
4,887,299 A 12/1989 Cummins et al.
4,926,464 A 5/1990 Schley-May
4,930,156 A 5/1990 Norris
4,995,085 A 2/1991 Kern et al.
5,010,575 A 4/1991 Marutake et al.
5,027,410 A 6/1991 Williamson et al.
5,029,215 A 7/1991 Miller, II
5,086,464 A 2/1992 Groppe
5,091,952 A 2/1992 Williamson et al.
5,189,704 A 2/1993 Krauss
5,212,827 A 5/1993 Meszko et al.
5,214,709 A 5/1993 Ribic
5,226,087 A 7/1993 Ono et al.
5,280,524 A 1/1994 Norris
5,289,544 A 2/1994 Franklin
5,390,254 A 2/1995 Adelman
5,404,407 A 4/1995 Weiss
5,422,628 A 6/1995 Rodgers
5,425,104 A 6/1995 Shennib
5,434,924 A 7/1995 Jampolsky
5,463,692 A 10/1995 Fackler
5,479,522 A 12/1995 Lindemann et al.
5,483,599 A 1/1996 Zagorski
5,502,769 A 3/1996 Gilbertson
5,524,056 A 6/1996 Killion et al.
5,553,152 A 9/1996 Newton
5,581,747 A 12/1996 Anderson
5,600,728 A 2/1997 Satre
5,629,985 A 5/1997 Thompson
5,636,285 A 6/1997 Sauer
5,640,293 A 6/1997 Dawes et al.
5,640,457 A 6/1997 Gnecco et al.
5,651,071 A 7/1997 Lindemann et al.
5,659,621 A 8/1997 Newton
5,687,242 A 11/1997 Iburg
5,706,351 A 1/1998 Weinfurtner
5,710,820 A 1/1998 Martin et al.
5,721,783 A 2/1998 Anderson
5,734,976 A 3/1998 Bartschi et al.
5,737,430 A 4/1998 Widrow
5,740,257 A 4/1998 Marcus
5,751,820 A 5/1998 Taenzer
5,757,932 A 5/1998 Lindemann et al.
5,757,933 A 5/1998 Preves et al.
5,768,397 A 6/1998 Fazio
5,796,848 A 8/1998 Martin
5,809,151 A 9/1998 Husung
5,822,442 A 10/1998 Agnew et al.
5,823,610 A 10/1998 Ryan et al.
5,825,631 A 10/1998 Prchal
5,835,610 A 11/1998 Ishige et al.
5,835,611 A 11/1998 Kaiser et al.
5,852,668 A 12/1998 Ishige et al.
5,862,238 A 1/1999 Agnew et al.
5,991,419 A 11/1999 Brander
5,991,420 A 11/1999 Stern
6,031,922 A 2/2000 Tibbetts
6,031,923 A 2/2000 Gnecco et al.
6,041,129 A 3/2000 Adelman
6,078,675 A 6/2000 Bowen-Nielsen et al.
6,078,825 A 6/2000 Hahn et al.
6,101,258 A 8/2000 Killion et al.
6,104,821 A 8/2000 Husung
6,115,478 A 9/2000 Schneider
6,118,877 A 9/2000 Lindemann et al.
6,144,748 A 11/2000 Kerns
6,148,087 A 11/2000 Martin
6,157,727 A 12/2000 Rueda
6,157,728 A 12/2000 Tong et al.
6,175,633 B1 1/2001 Morrill et al.
6,216,040 B1 4/2001 Harrison
6,236,731 B1 5/2001 Brennan et al.
6,240,192 B1 5/2001 Brennan et al.
6,240,194 B1 5/2001 De Koning
6,310,556 B1 10/2001 Green et al.
6,311,155 B1 10/2001 Vaudrey et al.
6,324,291 B1 11/2001 Weidner
6,327,370 B1 12/2001 Killion et al.
6,347,148 B1 2/2002 Brennan et al.
6,356,741 B1 3/2002 Bilotti et al.
6,366,863 B1 4/2002 Bye et al.
6,381,308 B1 4/2002 Cargo et al.
6,389,142 B1 5/2002 Hagen et al.
6,449,662 B1 9/2002 Armitage
6,459,882 B1 10/2002 Palermo et al.
6,466,679 B1 10/2002 Husung
6,522,764 B1 2/2003 Bogeskov-Jensen
6,549,633 B1 4/2003 Westermann
6,633,645 B2 10/2003 Bren et al.
6,760,457 B1 7/2004 Bren et al.
7,016,511 B1 3/2006 Shennib
7,103,191 B1 9/2006 Killion
7,116,792 B1 10/2006 Taenzer et al.
7,139,404 B2 11/2006 Feeley et al.
7,162,381 B2 1/2007 Boor et al.
7,248,713 B2 7/2007 Bren et al.
7,317,997 B2 1/2008 Boor et al.
7,369,669 B2 5/2008 Hagen et al.
7,447,325 B2 11/2008 Bren et al.
7,561,707 B2 7/2009 Kornagel
7,590,253 B2 9/2009 Killion
7,822,217 B2 10/2010 Hagen et al.
2001/0007050 A1 7/2001 Adelman
2002/0006206 A1 1/2002 Scofield
2002/0076073 A1 6/2002 Taenzer et al.
2002/0090099 A1 7/2002 Hwang
2002/0131614 A1 9/2002 Jakob et al.
2002/0186857 A1 12/2002 Bren et al.
2003/0045283 A1 3/2003 Hagedoorn
2003/0059073 A1 3/2003 Bren et al.
2003/0059076 A1 3/2003 Martin
2003/0133582 A1 7/2003 Niederdrank
2003/0215106 A1 11/2003 Hagen et al.
2004/0010181 A1 1/2004 Feeley et al.
2004/0052391 A1 3/2004 Bren et al.
2004/0052392 A1 3/2004 Sacha et al.
2004/0077387 A1 4/2004 Sayag et al.
2005/0160270 A1 7/2005 Goldberg et al.
2006/0013420 A1 1/2006 Sacha
2006/0018497 A1 1/2006 Kornagel
2006/0039577 A1 2/2006 Sanguino et al.
2006/0068842 A1 3/2006 Sanguino et al.
2006/0093172 A1 5/2006 Ludvigsen et al.
2006/0193273 A1 8/2006 Passier et al.
2006/0198529 A1 9/2006 Kjems et al.
2006/0205349 A1 9/2006 Passier et al.
2006/0274747 A1 12/2006 Duchscher et al.
2007/0121975 A1 5/2007 Sacha et al.
2007/0149261 A1 6/2007 Huddart
2007/0248237 A1 10/2007 Bren et al.
2008/0008341 A1 1/2008 Edwards
2008/0013769 A1 1/2008 Sacha et al.
2008/0273727 A1 11/2008 Hagen et al.
2008/0306745 A1 12/2008 Roy et al.

FOREIGN PATENT DOCUMENTS

| | | | |
|---|---|---|---|
| CH | 673551 | | 3/1990 |
| DE | 2510731 | A1 | 9/1976 |
| DE | 3036417 | | 5/1982 |
| DE | 3443907 | | 6/1985 |
| DE | 10146886 | | 4/2003 |
| EP | 0789474 | A2 | 8/1997 |
| EP | 0941014 | A2 | 9/1999 |
| EP | 0989775 | A1 | 3/2000 |
| EP | 1185138 | | 3/2002 |
| EP | 1196008 | A2 | 4/2002 |
| EP | 1398995 | A2 | 3/2004 |
| EP | 1174003 | B1 | 7/2004 |
| EP | 1484942 | A2 | 12/2004 |
| EP | 1519625 | A2 | 3/2005 |
| EP | 1531650 | A2 | 5/2005 |
| FR | 2714561 | | 6/1995 |
| JP | 09-018998 | | 1/1997 |
| WO | WO-96/41498 | A1 | 12/1996 |
| WO | WO-0021332 | A2 | 4/2000 |
| WO | WO-0158064 | A1 | 8/2001 |
| WO | WO-01/67433 | A1 | 9/2001 |
| WO | WO-02/09363 | A2 | 1/2002 |
| WO | WO-0203750 | A2 | 1/2002 |
| WO | WO-0223950 | A2 | 3/2002 |
| WO | WO-2004034738 | A1 | 4/2004 |
| WO | WO-2004/100607 | A1 | 11/2004 |
| WO | WO-2004110099 | A2 | 12/2004 |
| WO | WO-2005/101731 | A2 | 10/2005 |
| WO | WO-2006/023857 | A1 | 3/2006 |
| WO | WO-2006/023920 | A1 | 3/2006 |
| WO | WO-2006078586 | A2 | 7/2006 |
| WO | WO-2006/133158 | A1 | 12/2006 |

OTHER PUBLICATIONS

Preves, D. A., "A Look at the Telecoil—It's Development and Potential", *SHHH Journal,* (Sep./Oct. 1994), 7-10.

"European Application Serial No. 07254947.0, Extended European Search Report mailed Apr. 3, 2008", 6 pgs.

"Kleer Announces Reference Design for Wireless Earphones", [Online]. Retrieved from the Internet: <URL:http://kleer.com/newsevents/press_releases/prjan2.php>, (Jan. 2, 2007), 2 pgs.

"U.S. Appl. No. 09/659,214, Advisory Action mailed Jun. 2, 2003", 3 pgs.

"U.S. Appl. No. 09/659,214, Final Office Action mailed Feb. 14, 2003", 7 pgs.

"U.S. Appl. No. 09/659,214, Final Office Action mailed Mar. 19, 2003", 7 pgs.

"U.S. Appl. No. 09/659,214, Non Final Office Action mailed Jul. 18, 2003", 7 pgs.

"U.S. Appl. No. 09/659,214, Non Final Office Action mailed Sep. 6, 2002", 7 pgs.

"U.S. Appl. No. 09/659,214, Notice of Allowance mailed Feb. 10, 2004", 6 pgs.

"U.S. Appl. No. 09/659,214, Response filed May 19, 2003 to Final Office Action mailed Mar. 19, 2003", 9 pgs.

"U.S. Appl. No. 09/659,214, Response filed Oct. 24, 2003 to Non Final Office Action mailed Jul. 18, 2003", 9 pgs.

"U.S. Appl. No. 09/659,214, Response filed Nov. 12, 2002 to Non Final Office Action mailed Sep. 6, 2002", 10 pgs.

"U.S. Appl. No. 10/214,045, 312 Amendment filed Jun. 12, 2003", 6 pgs.

"U.S. Appl. No. 10/214,045, Non Final Office Action mailed Dec. 2, 2002", 7 pgs.

"U.S. Appl. No. 10/214,045, Notice of Allowance mailed Apr. 8, 2003", 17 pgs.

"U.S. Appl. No. 10/214,045, Response filed Apr. 2, 2002 to Non Final Office Action mailed Dec. 2, 2002", 8 pgs.

"U.S. Appl. No. 10/243,412, Examiner Interview Summary mailed Mar. 9, 2006", 7 pgs.

"U.S. Appl. No. 10/243,412, Final Office Action mailed Jan. 9, 2008", 6 pgs.

"U.S. Appl. No. 10/243,412, Non Final Office Action mailed May 17, 2007", 10 pgs.

"U.S. Appl. No. 10/243,412, Non Final Office Action mailed Jul. 28, 2006", 10 pgs.

"U.S. Appl. No. 10/243,412, Notice of Allowance mailed Jun. 30, 2008", 8 pgs.

"U.S. Appl. No. 10/243,412, Response filed Jan. 16, 2006 to Restriction Requirement mailed Dec. 16, 2005", 12 pgs.

"U.S. Appl. No. 10/243,412, Response filed May 9, 2008 to Non-Final Office Action mailed Jan. 9, 2008", 12 pgs.

"U.S. Appl. No. 10/243,412, Response filed Sep. 17, 2007 to Non Final Office Action mailed May 17, 2007", 15 pgs.

"U.S. Appl. No. 10/243,412, Response filed Dec. 28, 2006 to Non Final Office Action mailed Jul. 28, 2006", 16 pgs.

"U.S. Appl. No. 10/243,412, Restriction Requirement mailed Dec. 16, 2005", 5 pgs.

"U.S. Appl. No. 10/244,295, Final Office Action mailed May 24, 2007", 11 pgs.

"U.S. Appl. No. 10/244,295, Final Office Action mailed Aug. 11, 2006", 9 pgs.

"U.S. Appl. No. 10/244,295, Non Final Office Action mailed Feb. 3, 2006", 9 pgs.

"U.S. Appl. No. 10/244,295, Non-Final Office Action mailed Mar. 11, 2005", 10 pgs.

"U.S. Appl. No. 10/244,295, Non-Final Office Action mailed Nov. 29, 2006", 12 pgs.

"U.S. Appl. No. 10/244,295, Notice of Allowance mailed Aug. 7, 2007", 7 pgs.

"U.S. Appl. No. 10/244,295, Response filed May 3, 1920 to Non-Final Office Action mailed Feb. 3, 2006", 17 pgs.

"U.S. Appl. No. 10/244,295, Response filed Jun. 13, 2005 to Non-Final Office Action mailed Mar. 11, 2005", 20 pgs.

"U.S. Appl. No. 10/244,295, Response filed Jul. 24, 2007 to Final Office Action mailed May 24, 2007", 12 pgs.

"U.S. Appl. No. 10/244,295, Response filed Oct. 11, 2006 Final Office Action mailed Aug. 11, 2006", 17 pgs.

"U.S. Appl. No. 10/244,295, Response filed Feb. 28, 2007 to Non-Final Office Action mailed Nov. 29, 2006", 16 pgs.

"U.S. Appl. No. 10/284,877, Final Office Action mailed Jun. 14, 2006", 11 pgs.

"U.S. Appl. No. 10/284,877, Final Office Action mailed Nov. 14, 2006", 11 pgs.

"U.S. Appl. No. 10/284,877, Non Final Office Action mailed Mar. 25, 2005", 8 pgs.

"U.S. Appl. No. 10/284,877, Non Final Office Action mailed Dec. 1, 2005", 10 pgs.

"U.S. Appl. No. 10/284,877, Notice of Allowance mailed Mar. 22, 2007", 7 pgs.

"U.S. Appl. No. 10/284,877, Response filed Mar. 1, 2006 to Non Final Office Action mailed Dec. 1, 2005", 17 pgs.

"U.S. Appl. No. 10/284,877, Response filed Mar. 14, 2007 to Final Office Action mailed Nov. 14, 2007", 8 pgs.

"U.S. Appl. No. 10/284,877, Response filed Jun. 27, 2005 to Non Final Office Action mailed Mar. 25, 2005", 15 pgs.

"U.S. Appl. No. 10/284,877, Response filed Oct. 16, 2006 to Final Office Action mailed Jun. 14, 2006", 16 pgs.

"U.S. Appl. No. 11/456,538, Non-Final Office Action mailed Aug. 19, 2010", 25 Pgs.

"European Application Serial No. 07252582.7, Extended European Search Report mailed Apr. 4, 2008", 7 pgs.

"European Application Serial No. 07252582.7, Office Action Mailed Feb. 6, 2009", 2 pgs.

"European Application Serial No. 07254947.0, Office Action mailed Oct. 12, 2010", 4 pgs.

Beck, L. B., "The "T" Switch; Some Tips for Effective Use", Shhh, (Jan.-Feb. 1989), 12-15.

Davis, A., et al., "Magnitude of Diotic Summation in Speech-in-Noise Tasks:Performance Region and Appropriate Baseline", British Journal of Audiology, 24, (1990), 11-16.

Gilmore, R., "Telecoils: past, present & future", Hearing Instruments, 44 (2), (1993), pp. 22, 26-27, 40.

Halverson, H. M., "Diotic Tonal Volumes as a Function of Difference of Phase", The American Journal of Psychology, 33(4), (Oct. 1922), 526-534.

Hansaton Akustik GMBH, “48 K-AMP CONTACTMATIC”, (from Service Manual), (Apr. 1996), 8 pgs.
Lacanette, Kerry, “A Basic Introduction to Filters—Active, Passive, and Switched-Capacitor”, National Semiconductor Corporation, http://www.swarthmore.edu/NatSci/echeeve1/Ref/DataSheet/Inttofilters.pdf, (Apr. 1991), 1-22.
Lindemann, Eric, “Two Microphone Nonlinear Frequency Domain Beamformer for Hearing Aid Noise Reduction”, Proc. IEEE Workshop on Applications of Signal Processing to Audio and Acoustics, (1995), 24-27.
Lybarger, S. F., “Development of a New Hearing Aid with Magnetic Microphone”, Electrical Manufacturing, (Nov. 1947), 11 pages.
Preves, David A., “Field Trial Evaluations of a Switched Directional/Omnidirectional In-the-Ear Hearing Instrument”, Journal of the American Academy of Audiology, 10(5), (May 1999), 273-283.
Schaefer, Conrad, “Letter referencing Micro Ear Patent”, (Aug. 22, 2002), 2 pgs.
Srinivasan, S., “Low-bandwidth binaural beamforming”, IEEE Electronics Letters, vol. 44, No. 22, (Oct. 23, 2008), 2 pgs.
Srinivasan, Sriram, et al., “Beamforming under Quantization Errors in Wireless Binaural Hearing Aids”, EURASIP Journal on Audio, Speech, and Music Processing, vol. 2008, Article ID 824797, (Jan. 28, 2008), 8 pgs.
Teder, Harry, “Something New in CROS”, Hearing Instruments, vol. 27, No. 9, Published by Harcourt Brace Jovanovich, (Sep. 1976), pp. 18-19.
Zelnick, E., “The Importance of Interaural Auditory Differences in Binaural Hearing”, In: Binaural Hearing and Amplification, vol. 1, Libby, E. R., Editor, Zenetron, Inc., Chicago, IL, (1980), 81-103.
“U.S. Appl. No. 09/052,631, Final Office Action mailed Jul. 11, 2000”, 8 pgs.
“U.S. Appl. No. 09/052,631, Final Office Action mailed Jul. 30, 2001”, 5 pgs.
“U.S. Appl. No. 09/052,631, Non Final Office Action mailed Jan. 18, 2001”, 6 pgs.
“U.S. Appl. No. 09/052,631, Non Final Office Action mailed Dec. 28, 1999”, 10 pgs.
“U.S. Appl. No. 09/052,631, Notice of Allowance mailed Dec. 18, 2001”, 6 pgs.
“U.S. Appl. No. 09/052,631, Response filed May 18, 2001 to Non Final Office Action mailed Jan. 18, 2001”, 7 pgs.
“U.S. Appl. No. 09/052,631, Response filed Oct. 30, 2001 to Final Office Action mailed Jul. 30, 2001”, 5 pgs.
“U.S. Appl. No. 09/052,631, Response filed Nov. 10, 2000 to Final Office Action mailed Jul. 11, 2000”, 5 pgs.
“U.S. Appl. No. 10/146,536, Advisory Action mailed Oct. 16, 2007”, 5 pgs.
“U.S. Appl. No. 10/146,536, Final Office Action mailed May 18, 2007”, 28 pgs.
“U.S. Appl. No. 10/146,536, Non-Final Office Action mailed Sep. 19, 2006”, 26 pgs.
“U.S. Appl. No. 10/146,536, Non-Final Office Action mailed Dec. 16, 2005”, 25 pgs.
“U.S. Appl. No. 10/146,536, Notice of Allowance mailed Dec. 27, 2007”, 10 pgs.
“U.S. Appl. No. 10/146,536, Response filed Feb. 20, 2007 to Non-Final Office Action mailed Sep. 19, 2006”, 20 pgs.
“U.S. Appl. No. 10/146,536, Response filed Jun. 16, 2006 to Non-Final Office Action mailed Dec. 16, 2005”, 14 pgs.
“U.S. Appl. No. 10/146,536, Response filed Nov. 19, 2007 to Final Office Action mailed May 18, 2007”, 19 pgs.
“U.S. Appl. No. 10/146,536, Response filed Sep. 18, 2007 to Final Office Action dated Jun. 18, 2007”, 24 pgs.
“U.S. Appl. No. 11/456,538, Response filed Jan. 19, 2011 to Non Final Office Action mailed Aug. 19, 2010”, 16 pgs.
“U.S. Appl. No. 12/115,423, Notice of Allowance mailed Sep. 15, 2010”, 9 pgs.
“Canadian Application No. 2,428,908, Office action mailed Mar. 15, 2007”, 6 pgs.
“Canadian Application No. 2,428,908, Office action mailed Nov. 4, 2008”, 9 pgs.
“European Application Serial No. 03253052, European Search Report mailed Nov. 24, 2005”, 2 pgs.
“European Application Serial No. 03253052.9, Office Action mailed Mar. 26, 2009”, 3 pgs.
“European Application Serial No. 03253052.9, Response filed Dec. 7, 2010 to Office Action mailed Mar. 26, 2009”, 19 pgs.
“European Application Serial No. 07252582.7, Response filed Aug. 11, 2009 to Office Communication mailed Feb. 6, 2009”, 2 pgs.
“European Application Serial No. 07252582.7.0, Office Action mailed Oct. 15, 2010”, 4 pgs.
“European Application Serial No. 07254947.0, Response filed Feb. 28, 2009 to Official Communication mailed Aug. 25, 2008”, 2 pgs.
“Technical Data Sheet—Microphone Unit 6903”, Published by Microtronic, (Dec. 2000), 2 pgs.
Griffing, Terry S, et al., “Acoustical Efficiency of Canal ITE Aids”, Audecibel, (Spring 1983), 30-31.
Griffing, Terry S, et al., “Custom canal and mini in-the-ear hearing aids”, Hearing Instruments, vol. 34, No. 2, (Feb. 1983), 31-32.
Griffing, Terry S, et al., “How to evaluate, sell, fit and modify canal aids”, Hearing Instruments, vol. 35, No. 2, (Feb. 1984), 3.
Mahon, William J, “Hearing Aids Get a Presidential Endorsement”, The Hearing Journal,, (Oct. 1983), 7-8.
Sullivan, Roy F, “Custom canal and concha hearing instruments: A real ear comparison Part I”, Hearing Instruments, vol. 40, No. 4, (Jul. 1989), 23-29.
Sullivan, Roy F, “Custom canal and concha hearing instruments: A real ear comparison Part II”, Hearing Instruments, vol. 40, No. 7, (Jul. 1989), 30-36.
“U.S. Appl. No. 11/456,538, Final Office Action mailed Mar. 3, 2011”, 28 pgs.
“Canadian Application Serial No. 2,428,908, Response filed Sep. 17, 2007 to Office Action mailed Mar. 15, 2007”, 25 pgs.
“European Application Serial No. 03253052.9, Response filed Oct. 5, 2009 to Office Action filed Mar. 26, 2009”, 25 pgs.
“European Application Serial No. 07252582.7, Response to Office Action filed Apr. 20, 2011”, 4 pgs.
“European Application Serial No. 07254947.0, Response filed Apr. 26, 2011 to Official Communication mailed Oct. 12, 2010”, 11 pgs.
Greefkes, J. A, et al., “Code Modulation with Digitally Controlled Companding for Speech Transmission”, Philips Tech. Rev., 31(11/12), (1970), 335-353.
Peissig, J., et al., “Directivity of binaural noise reduction in spatial multiple noise-source arrangements for normal and impaired listeners”, J Acoust Soc Am., 101(3), (Mar. 1997), 1660-70.

WIRELESS SYSTEM FOR HEARING COMMUNICATION DEVICES PROVIDING WIRELESS STEREO RECEPTION MODES

FIELD OF THE INVENTION

This application relates generally to hearing communication devices, and more particularly to a wireless system for hearing communication devices providing wireless stereo reception modes.

BACKGROUND

Modern hearing communication devices that offer stereo reception typically require a wire between the left and right devices. For example, wireless stereo headsets generally include a stereo receiver and a wired connection to feed both the left and right speakers with the stereo connection. Such devices are not readily applied to other hearing communication devices, such as hearing aids. This is in part because wires are inconvenient, prone to breakage and can be less aesthetically pleasing to users who wish to conceal or downplay their use of hearing aids or other hearing communication devices.

Thus, there is a need in the art for an inconspicuous, robust, and elegant system for communicating stereo information to a wearer of hearing communication devices. The system should be convenient to use and to manufacture.

SUMMARY

This application addresses the foregoing needs in the art and other needs not discussed herein. The various embodiments described herein relate to wireless systems for hearing communication devices providing wireless stereo reception modes.

The present subject matter relates to the wireless stereo reception of first and second audio information by hearing communication devices. One type of device which may employ the present subject matter is a hearing aid. Various forms and protocols of signal transmission are employed in varying embodiments. The present subject matter includes various communication modes such as eavesdropping modes and relaying modes.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings.

DETAILED DESCRIPTION

In the following detailed description specific details are set forth to generally demonstrate various embodiments of the invention and to allow one of skill in the art to make and use the invention in its various forms. Thus, the following detailed description is not intended to provide an exclusive or exhaustive treatment of the present subject matter.

It should be noted that references to "an", "one", or "various" embodiments in this disclosure are not necessarily to the same embodiment, and such references contemplate more than one embodiment.

Figure 1:
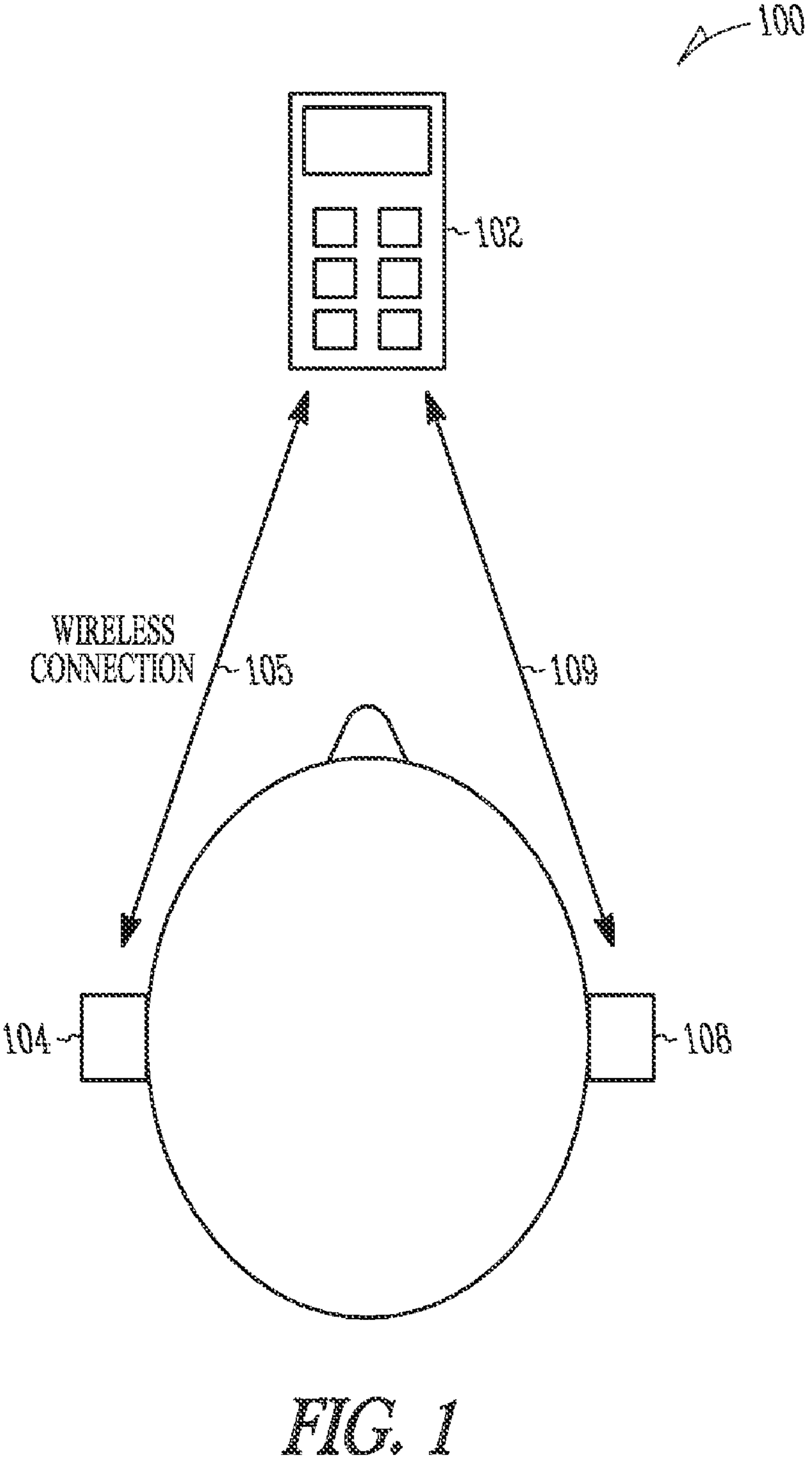
FIG. 1 shows one system using wireless devices in a direct communication mode according to one embodiment of the present subject matter.

FIG. 1 shows one system 100 using wireless devices in a direct communication mode with a remote source 102 according to one embodiment of the present subject matter. Remote source 102 transmits signals 105 to the first hearing communication device 104 including first audio information. Remote source 102 also transmits signals 109 to the second hearing communication device 108 including second audio information. In this embodiment, the first hearing communication device 104 does not have a wireless connection to the second hearing communication device 108 for transmitting stereo information from the first hearing communication device 104 to the second hearing communication device 108. Thus, the first audio information is wirelessly received by the first hearing communication device 104 and played to a first ear of the wearer and the second audio information is wirelessly received by the second hearing communication device 108 and played to the second ear of the wearer.

Figure 2:
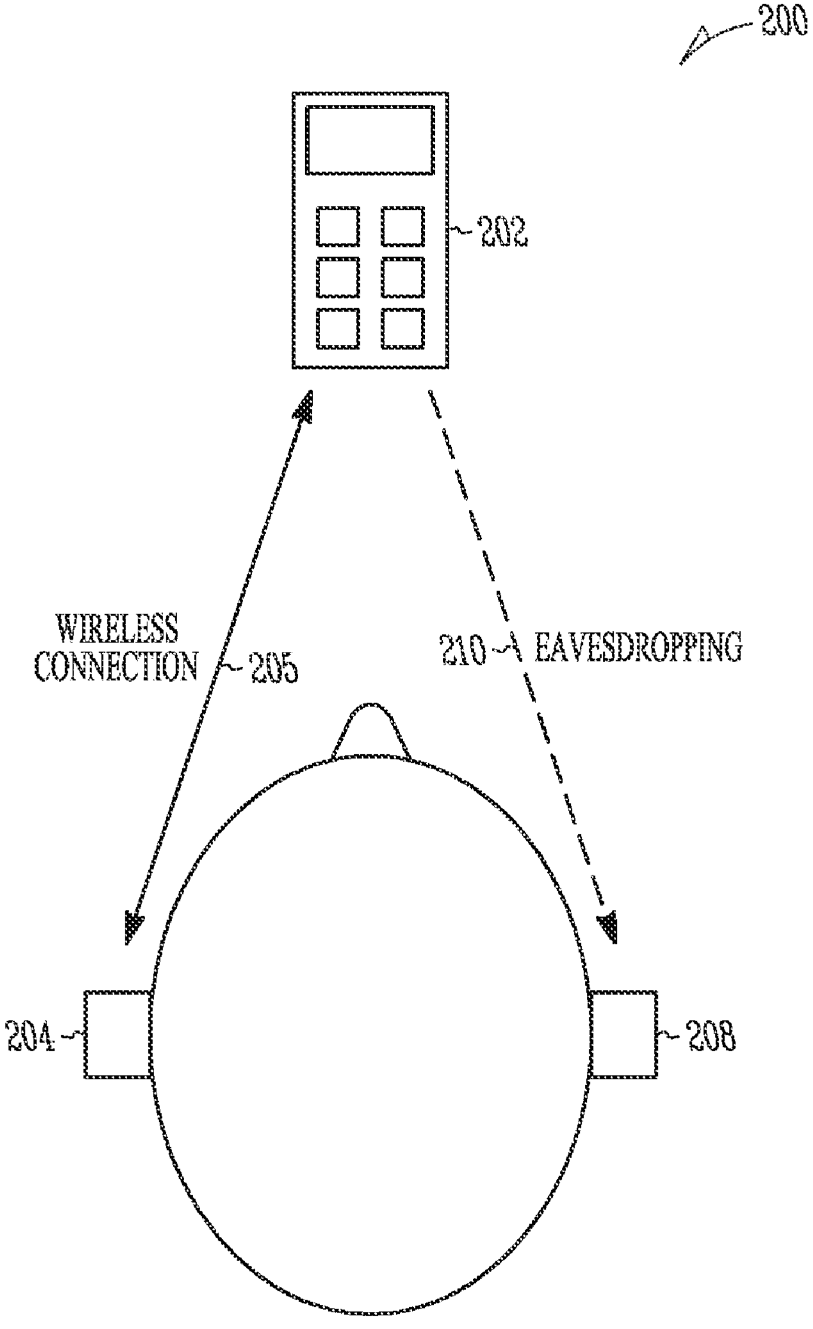
FIG. 2 shows one application using wireless devices in an eavesdropping communication mode according to one embodiment of the present subject matter.

The system in various embodiments can also support eavesdropping modes. For example, as shown in FIG. 2, in system 200 remote source 202 is in communications with first hearing communication device 204 via signals 205. Second hearing communication device 208 can "listen in" on communications from remote source 202 using a mode that is different than the mode used by the first hearing communication device 204. For instance, it is possible that second hearing communication device 208 receives signals 210, but does not control, for example, handshaking with remote source 202 to the same extent as first communication device 204. Other eavesdropping modes can be employed without departing from the scope of the present subject matter.

Figure 3:
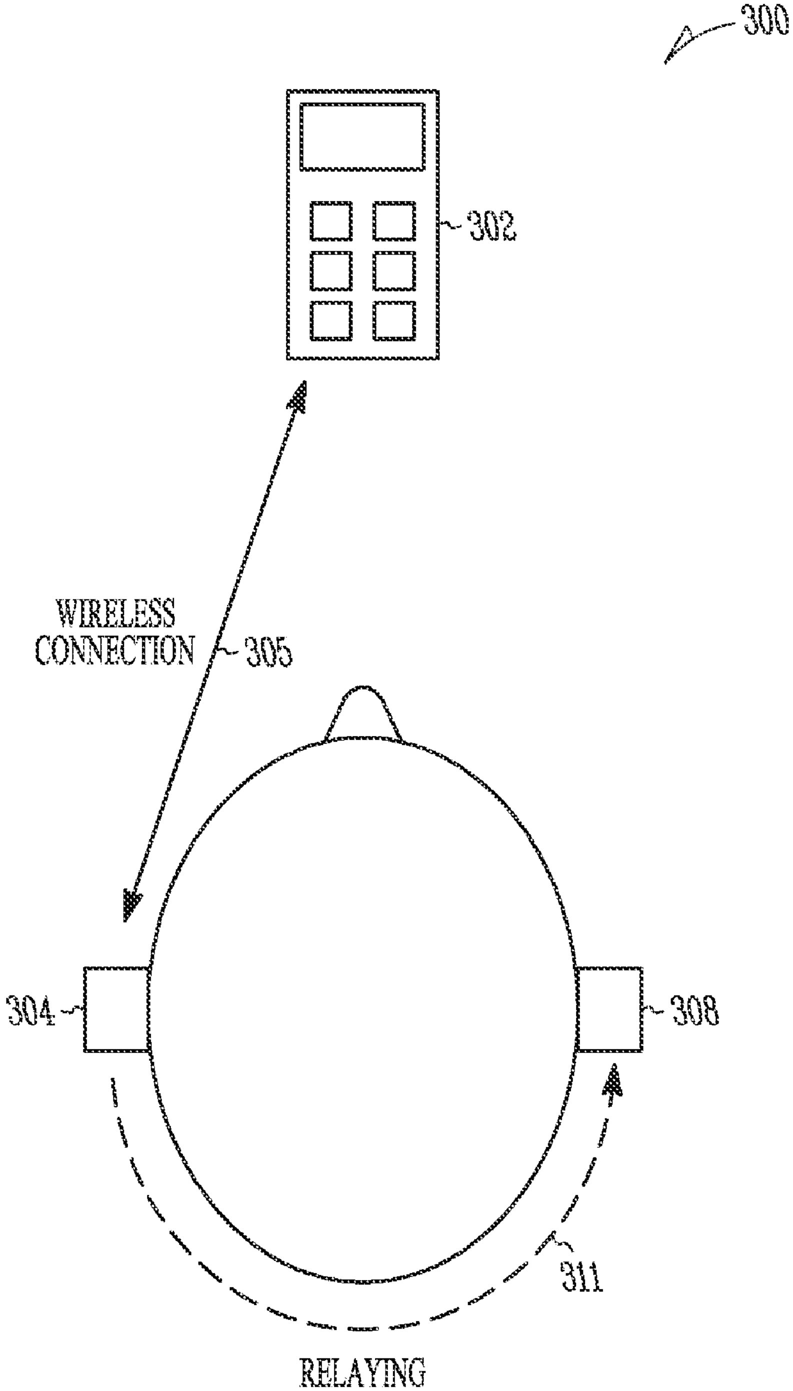
FIG. 3 shows one application using wireless devices in a relaying communication mode according to one embodiment of the present subject matter.

FIG. 3 depicts one embodiment where a relaying mode is employed to communicate wirelessly between the first hearing communication device 304 and the second hearing communication device 308. In this embodiment, first and second audio information is sent over signal 305 to the first hearing communication device 304. The second audio information is then relayed to the second hearing communication device 308 via relay signal 311. Such relay may be performed using different frequencies, different communication modes and with different data rates, for different implementations if desired. In one embodiment, the first hearing communication device 304 may demodulate and decode stereo information and encode and relay the channel bound for the instrument on or in the other ear. In various embodiments, the communications can be made using similar transmissions to the primary transmission. In various embodiments, the communications can be maded using a different method than that of the primary transmission. In various embodiments, the signals 305 and 311 are unidirectional. In various embodiments, the signals 305 and 311 are bidirectional. In various embodiments, the signals 305 and 311 are programmably combinations of unidirectional and/or bidirectional. Thus, the system 300 is highly programmable to adapt to a number of communication requirements and applications. In one embodiment, relay signal 311 is a substantially magnetically coupled or near field communication link. In one embodiment, a telecoil is employed to receive the relay signal 311. In one embodiment, a magnetic sensor is used to receive the relay signal 311. In one embodiment, relay signal 311 is a radio frequency or far field communication link. Other communication links, such as infrared and ultrasonic may be employed in various applications.

In the various embodiments and applications provided herein, different communications electronics are used by the systems (e.g., 100, 200, 300) to provide different communication modes for the stereo information. For example, in one embodiment a first channel and a second channel are employed to communicate the stereo information to the first and second ears, respectively. In one embodiment, the electronics includes frequency division multiplexed communications electronics. In one embodiment, the electronics includes time division multiplexed communications electronics. In one embodiment, the electronics includes code division multiplexed communications electronics. In one embodiment, the electronics includes packetized communications electronics. In one embodiment, the electronics includes analog communications electronics. In one embodiment, the electronics includes frequency modulated communications electronics. In one embodiment, the electronics includes single sideband communications electronics. In one embodiment, the electronics includes amplitude modulated communications electronics. In one embodiment, the electronics includes phase modulated communications electronics. Other modulation and communications embodiments are within the scope of the present subject matter and those examples provided herein are intended to demonstrate the flexibility and adaptability of the present subject matter.

The systems (e.g., 100, 200, and 300) in various embodiments can also support communications modes where the first audio information and the second audio information are the same or substantially the same audio information.

In various embodiments, the remote source (e.g., 102, 202, and 302) supports one or more communication protocols. In various embodiments, communications of far field signals are supported. Some embodiments employ 2.4 GHz communications. In various embodiments the wireless communications can include standard or nonstandard communications. Some examples of standard wireless communications include, but are not limited to, FM, AM, SSB, BLUETOOTH™, IEEE 802.11 (wireless LANs) wi-fi, 802.15 (WPANs), 802.16 (WiMAX), 802.20, and cellular protocols including, but not limited to CDMA (code division multiple access) and GSM, ZigBee, and ultra-wideband (UWB) technologies. Such protocols support radio frequency communications and some support infrared communications. Other available forms of wireless communications include ultrasonic, optical, and others. It is understood that the standards which can be used include past and present standards. It is also contemplated that future versions of these standards and new future standards may be employed without departing from the scope of the present subject matter.

Such remote sources (e.g., 102, 202, and 302) include, but are not limited to, cellular telephones, personal digital assistants, personal computers, streaming audio devices, wide area network devices, local area network devices, personal area network devices, and remote microphones. In various embodiments, the remote source includes one or more of the interface embodiments demonstrated in U.S. Provisional Patent Application Ser. No. 60/687,707, filed Jun. 5, 2005, entitled: COMMUNICATION SYSTEM FOR WIRELESS AUDIO DEVICES, and U.S. patent application Ser. No. 11/447,617, filed Jun. 5, 2006, entitled: COMMUNICATION SYSTEM FOR WIRELESS AUDIO DEVICES which claims the benefit of the provisional application the entire disclosures of which are hereby incorporated by reference. In various embodiments, one or more of the hearing communication devices use the radio technology provided in Provisional Patent Application Ser. No. 60/687,707, and U.S. patent application Ser. No. 11/447,617, both of which are incorporated by reference in their entirety. In various embodiments a low power system is provided to allow communications between the remote sources and one or more hearing communication devices.

In the embodiments demonstrated herein, the listener has first and second hearing communication devices. In various embodiments, such devices include, but are not limited to, various types of hearing aids. In one embodiment, at least one wireless hearing assistance device is a behind-the-ear hearing aid. In one embodiment, at least one wireless hearing assistance device is an in-the-ear hearing aid. In one embodiment, at least one wireless hearing assistance device is a completely-in-the-canal hearing aid. In one embodiment, at least one wireless hearing assistance device is a wireless earpiece. Various examples of wireless adapters for some hearing assistance devices using a direct-audio input (DAI) interface are demonstrated in U.S. patent application Ser. No. 11/207,591, filed Aug. 18, 2005, entitled "WIRELESS COMMUNICATIONS ADAPTER FOR A HEARING ASSISTANCE DEVICE;" and PCT Patent Application No. PCT/US2005/029971, filed Aug. 18, 2005, entitled "WIRELESS COMMUNICATIONS ADAPTER FOR A HEARING ASSISTANCE DEVICE," the entire disclosures of which are incorporated by reference.

The wireless hearing communication devices can contain a microphone to receive sounds. Some examples include a microphone for reception of ambient sound, which can be encoded and transmitted by the wireless hearing assistance device. Another example is a microphone adapted for reception of speech by the wearer of the device. The speech can be encoded and transmitted by the wireless hearing assistance device. It is understood that in certain embodiments, the wireless hearing communication devices may be wireless hearing assistance devices. One type of hearing assistance device is a hearing aid. Other wireless communication devices may be employed having various information to communicate. Thus, the devices can support bidirectional communication modes.

In various embodiments, the communications between the remote source and one or more wireless communication devices are unidirectional. In various embodiments, the communications between the remote source and one or more wireless communication devices are bidirectional. In various embodiments, the communications include at least one unidirectional communication and one bidirectional communication. Thus, the system is highly programmable to adapt to a number of communication requirements and applications. In relaying embodiments, it is understood that the communications can be unidirectional or bidirectional.

It is understood that the examples set forth herein can be applied to a variety of wireless devices and primary and secondary device combinations. Thus, the examples set forth herein are not limited to cell phone applications.

This description has set forth numerous characteristics and advantages of various embodiments and details of structure and function of various embodiments, but is intended to be illustrative and not intended in an exclusive or exhaustive sense. Changes in detail, material and management of parts, order of process and design may occur without departing from the scope of the appended claims and their legal equivalents.

What is claimed is:

1. A system for a wearer having a first ear and a second ear, comprising:

a remote source adapted to provide stereo audio wireless communications;

a first hearing communication device adapted to receive wireless communications including first stereo channel audio information and second stereo channel audio information from the remote source, the first hearing communication device adapted to provide the first stereo channel audio information to the first ear; and a second hearing communication device adapted to receive wireless communications, including the second stereo channel audio information from the first hearing communication device, the second hearing communication device adapted to provide second stereo channel audio information to the second ear.

2. The system of claim 1, wherein the second hearing communication device is adapted to eavesdrop on communications from the remote source.

3. The system of claim 1, wherein the first hearing communication device includes a near field transmitter adapted for a magnetically coupled link.

4. The system of claim 3, wherein the second hearing communication device is adapted to receive the second stereo channel audio information from the first hearing communication device through the magnetically coupled link.

5. The system of claim 1, wherein the first hearing communication device includes a far field transmitter.

6. The system of claim 1, wherein the remote source is adapted to conduct the wireless communications on a first channel and on a second channel.

7. The system of claim 1, wherein the remote source is adapted to conduct frequency division multiplexed communications.

8. The system of claim 1, wherein the remote source is adapted to conduct time division multiplexed communications.

9. The system of claim 1, wherein the remote source is adapted to conduct code division multiplexed communications.

10. The system of claim 1, wherein the wherein the remote source is adapted to conduct packetized communications.

11. The system of claim 1, wherein the remote source is adapted to conduct analog communications.

12. The system of claim 1, wherein the remote source is adapted to conduct frequency modulated transmissions.

13. The system of claim 1, wherein the remote source is adapted to conduct single sideband modulated transmissions.

14. The system of claim 1, wherein the remote source is adapted to conduct amplitude modulated transmissions.

15. The system of claim 1, wherein the remote source is adapted to conduct phase modulated transmissions.

16. The system of claim 1, further comprising wherein the first hearing communication device includes Bluetooth-compatible communications electronics.

17. The system of claim 1, further comprising wherein the first hearing communication device includes IEEE 802.11-compatible communications electronics.

18. The system of claim 1, further comprising wherein the first hearing communication device includes CDMA-compatible communications electronics.

19. The system of claim 1, wherein the remote source is adapted to provide unidirectional wireless communications.

20. The system of claim 1, wherein the remote source is adapted to provide bidirectional wireless communications.

21. The system of claim 1, wherein the remote source is adapted to programmably provide unidirectional or bidirectional wireless communications.

22. The system of claim 1, wherein the first hearing communication device is a behind-the-ear hearing aid.

23. The system of claim 1, wherein the first hearing communication device is an in-the-ear hearing aid.

24. The system of claim 1, wherein the first hearing communication device is a completely-in-the-canal hearing aid.

25. A method, comprising:

transmitting a wireless signal including first stereo channel audio information and second stereo channel audio information;

wirelessly receiving the first and second stereo channel audio information with a first hearing communication device;

wirelessly receiving the second stereo channel audio information with a second hearing communication device;

playing the first stereo channel audio information to a first ear of a wearer using the first hearing communication device in or on the first ear; and playing the second stereo channel audio information to a second ear of the wearer using the second hearing communication device in or on the second ear.

26. The method of claim 25, wherein the second hearing communication device is eavesdropping on communications to the first hearing communication device.

27. The method of claim 25, comprising transmitting the second stereo channel audio information from the first hearing communication device to the second hearing communication device using substantially magnetically coupled communications.

28. The method of claim 25, comprising transmitting the second stereo channel audio information from the first hearing communication device to the second hearing communication device using far field coupled communications.

* * * * *

UNITED STATES PATENT AND TRADEMARK OFFICE

CERTIFICATE OF CORRECTION

PATENT NO. : 8,041,066 B2
APPLICATION NO. : 11/619541
DATED : October 18, 2011
INVENTOR(S) : Jeffrey P. Solum It is certified that error appears in the above-identified patent and that said Letters Patent is hereby corrected as shown below:

In column 5, line 40, in Claim 10, after "wherein the" delete "wherein the".

Signed and Sealed this
Fourth Day of December, 2012

David J. Kappos
*Director of the United States Patent and Trademark Office*